Feb. 17, 1959  J. D. SOWERBY  2,873,870
HEAVY LOAD TRANSPORTER HAVING TRACTION BELTS
Filed June 11, 1956  4 Sheets-Sheet 1
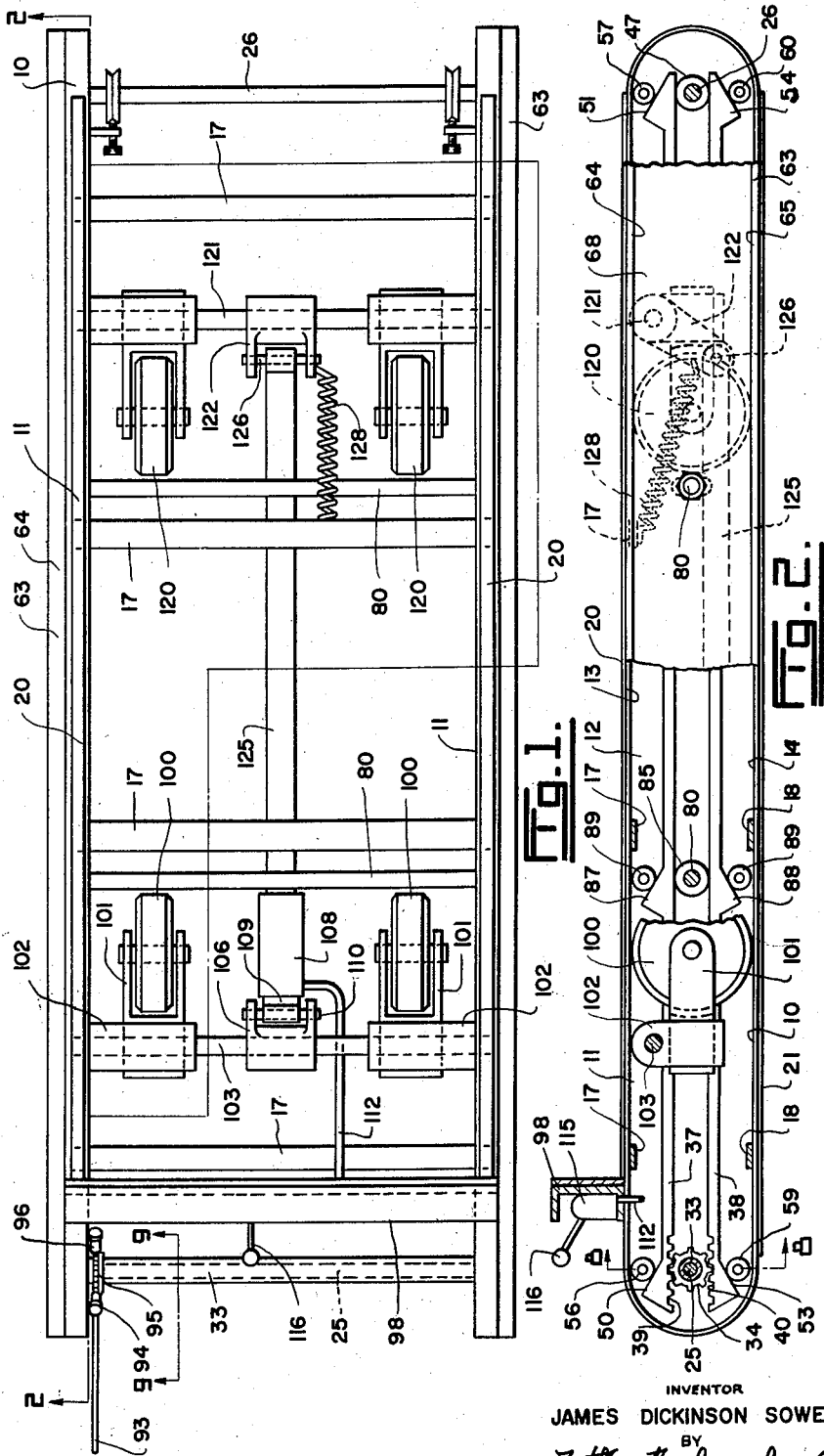
INVENTOR
JAMES DICKINSON SOWERBY
BY
Fetherstonhaugh & Co.

Feb. 17, 1959     J. D. SOWERBY     2,873,870
HEAVY LOAD TRANSPORTER HAVING TRACTION BELTS
Filed June 11, 1956     4 Sheets-Sheet 2
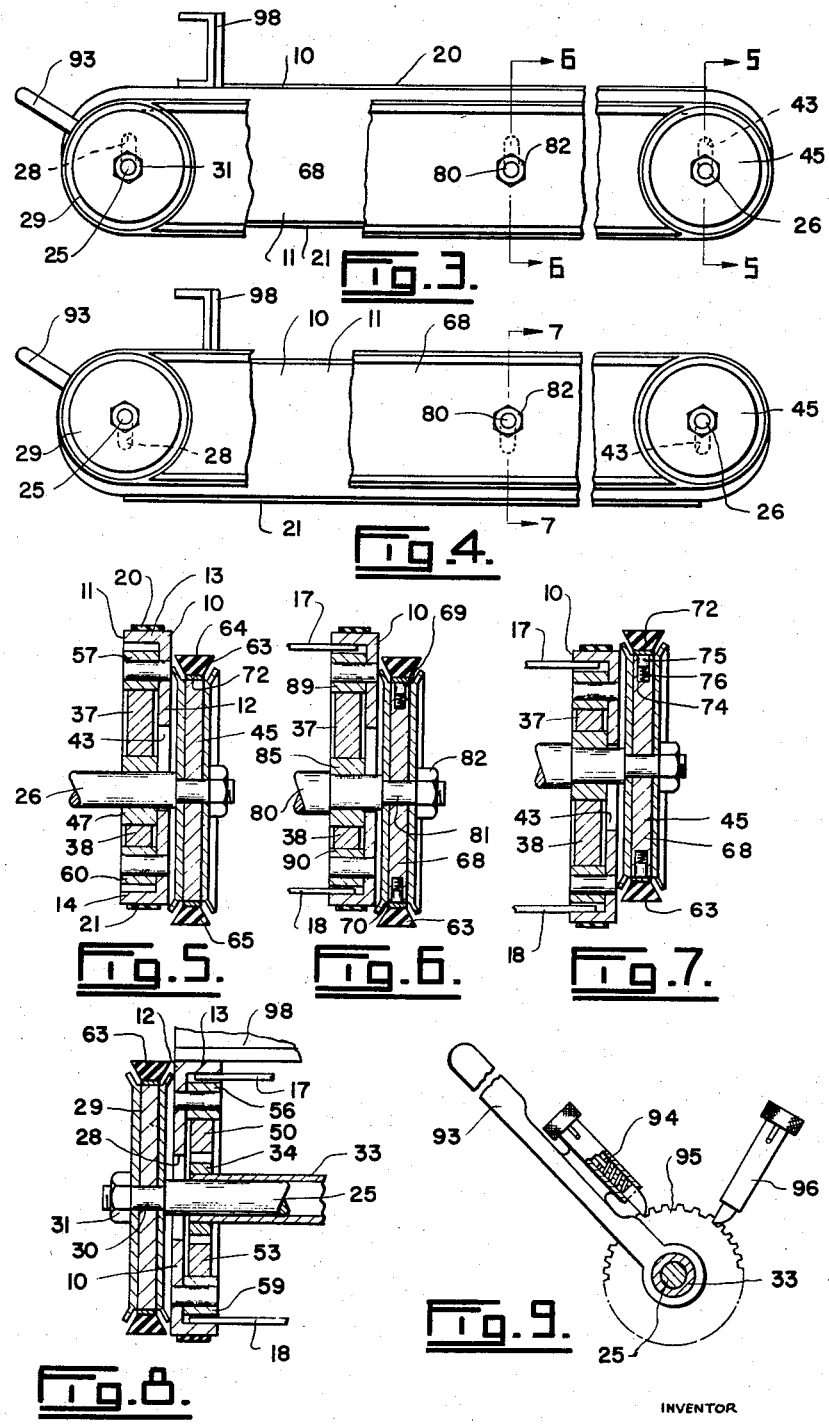
INVENTOR
JAMES DICKINSON SOWERBY
BY
Fetherstonhaugh & Co.

Feb. 17, 1959   J. D. SOWERBY   2,873,870
HEAVY LOAD TRANSPORTER HAVING TRACTION BELTS
Filed June 11, 1956   4 Sheets-Sheet 3
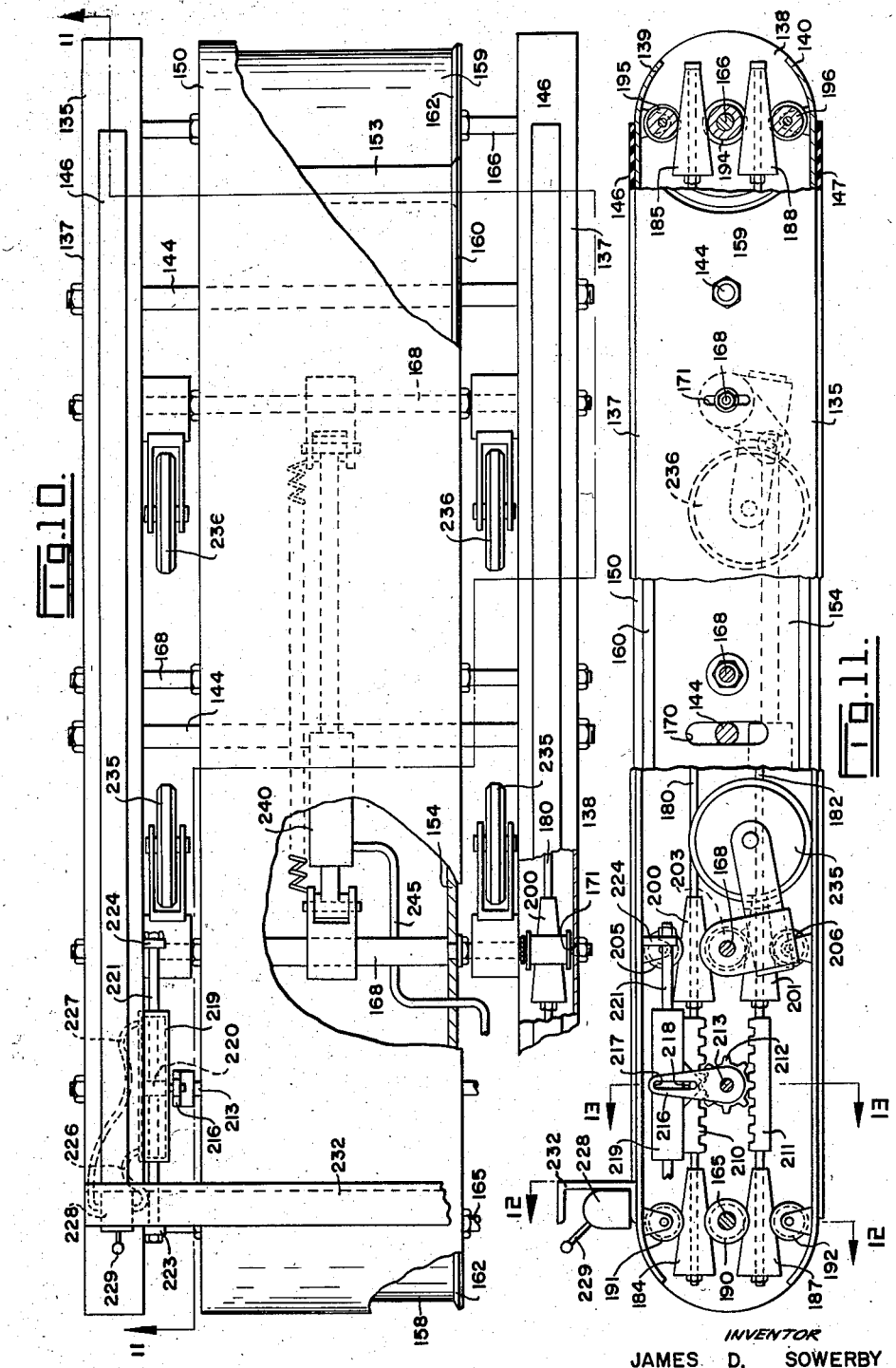
INVENTOR
JAMES D. SOWERBY
BY
Featherstonhaugh & Co.
ATTORNEYS

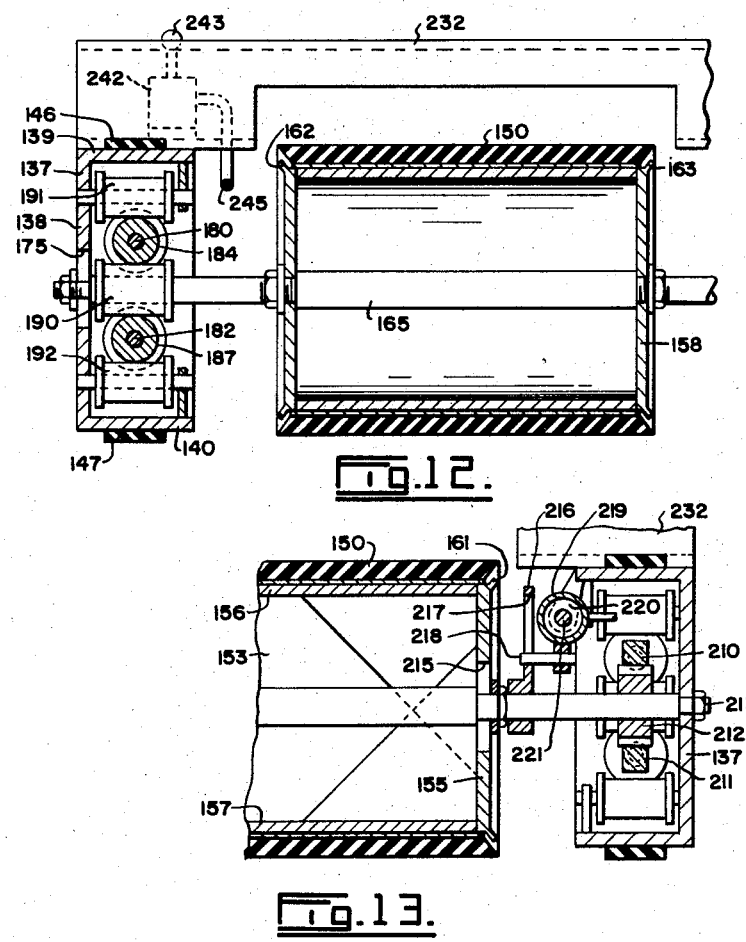

United States Patent Office 2,873,870
Patented Feb. 17, 1959

2,873,870

HEAVY LOAD TRANSPORTER HAVING TRACTION BELTS

James D. Sowerby, Vancouver, British Columbia, Canada

Application June 11, 1956, Serial No. 590,746

23 Claims. (Cl. 214—83.26)

This invention relates to heavy load transporters.

This is a continuation-in-part of my application Serial Number 366,592, filed July 7, 1953, now abandoned.

An object of the present invention is the provision of a transporter for relatively heavy loads such as pianos, refrigerators, stoves, heavy boxes and the like, or for any object which may be moved from place to place and anchored for operation, such as for small cranes, elevator platforms and the like.

Another object is the provision of a heavy load transporter primarily designed to be moved by hand, but which may also be provided with power to make it self propelling.

A further object is the provision of a load transporter having one or more traction belts for moving up or down slopes, or uneven ground, and wheels for easy movement over an even surface.

Yet another object is the provision of a transporter which is very low and has one or more belts to assist in the loading of heavy objects thereon.

A still further object is the provision of a heavy load transporter having a supporting frame and one or more traction belts with means for raising the belts above the top and bottom surfaces of the frame for loading purposes, and lowering the belts below said frame surfaces during movement of the transporter.

This transporter includes a supporting frame having at least one movable endless traction belt with upper and lower runs extending longitudinally thereof. Each belt is movable in a vertical plane relative to the frame, and the transporter includes means for selectively moving the upper run of the belt above the top of the frame and the lower belt run below the bottom thereof. In actual practice, it is desirable to raise and lower both runs of the belt at the same time. When the belt or belts are raised, the frame rests on the floor or ground. As the upper run of each belt is above the top of the frame, a portion of the object to be moved may be rested on the belt or belts which will move as the object is shifted on to the transporter. When it is desired to move the transporter with its load, each belt is lowered until the lower run thereof rests on the floor or ground and the frame lifted therefrom. The transporter may now be moved on the belt or belts. If it is desired to retard the motion of the transporter on a down slope, each belt may be raised a little to permit a non-rotatable portion of the frame to drag on the surface over which the transporter is moved.

If desired, the transporter may be provided with a plurality of retractable wheels mounted on the frame, and means for lowering the wheels to take the entire load of the transporter. If these wheels are included, they may be lowered when the transporter is on an even surface so that it may be moved faster and easier than it can be when it is moving on the belt or belts.

While the transporters hereinafter described include a supporting frame with a traction belt at each side thereof or a single centrally located traction belt, it is to be understood that more belts may be employed, depending upon the width of the transporter.

Examples of this invention are illustrated in the accompanying drawings, in which, Figure 1 is a plan view of one form of transporter having two traction belts, Figure 2 is a partial sectional view taken on the line 2—2 of Figure 1, with the traction belt in a neutral position, Figure 3 is a side elevation of this transporter with the traction belt in the lowered position, Figure 4 is a view similar to Figure 3 with the traction belt in the raised position, Figure 5 is an enlarged vertical section through one side of the unit taken on the line 5—5 of Figure 3, Figure 6 is an enlarged vertical section through the side of the unit taken on the line 6—6 of Figure 3, Figure 7 is an enlarged vertical section through a side of the unit taken on the line 7—7 of Figure 4, Figure 8 is an enlarged vertical section through one side of the transporter taken on the line 8—8 of Figure 2, Figure 9 is a detail section taken on the line 9—9 of Figure 1, Figure 10 is a plan view of an alternative form of transporter having a single traction belt, Figure 11 is a longitudinal section taken on the line 11—11 of Figure 10, Figure 12 is an enlarged cross section taken on the line 12—12 of Figure 11, one side of the transporter being omitted, and Figure 13 is an enlarged fragmentary cross section taken on the line 13—13 of Figure 11.

Referring to Figures 1 to 9 of the drawings, 10 is a supporting frame which may be of any desired construction. In this example, the frame is made up of two identical non-rotatable and spaced side members 11, each of which includes a vertical side 12 and upper and lower flanges 13 and 14, projecting inwardly therefrom, see particularly Figures 5 to 7. These side members are retained in their proper spaced positions by a plurality of spaced upper and lower cross members 17 and 18. If desired, friction strips 20 and 21 formed of any suitable material, such as rubber, may extend along the top and bottom of each side member 12.

As each frame side member 11 and the traction belt arrangement at each side of the transporter is the same as those on the opposite side thereof, one set only will now be described in detail for the sake of clarity.

The frame 10 is provided with transverse axles 25 and 26 adjacent opposite ends thereof. The axle 25 at one end extends through an elongated vertical slot 28 formed in the side 12 of a side member 11, see Figure 8, and has a bearing or wheel 29 mounted thereon in any desired manner. In this example, the axle has a reduced portion 30 extending outwardly from the end thereof, the outer end of said portion being threaded to receive a nut 31. A tube 33 is rotatably mounted on this axle and terminates at its opposite ends within the side members 11. A pinion 34 is fixedly mounted on each end of this tube.

A pair of spaced cam slides 37 and 38 extend longitudinally of the side members 11 within the flanges 13 and 14 thereof. The slides 37 and 38 are provided with racks 39 and 40, respectively, along their inner surfaces at one end thereof. These racks mesh with the pinion 34 so that rotation of the pinion moves the slides in opposite directions relative to each other.

The axle 26 at the opposite end of the transporter extends through an elongated vertical slot 43 in the vertical side of the member 11, see Figure 5, and has a bearing or wheel 45 mounted on its outer end in the same manner as the wheel 29 is mounted on axle 25. Axle 26 has a roller 47 freely mounted thereon between the slides 37 and 38.

The slide 37 is provided with cams 50 and 51 at its opposite ends adjacent the axles 25 and 26, said cams being parallel and sloping outwardly and upwardly from the slide. Similarly, the slide 38 is provided with cams 53 and 54 opposite and opposing cams 50 and 51 respectively, that is, the former cams are parallel and extend outwardly and downwardly from the slide, see Figure 2. The side member 11 is provided with rollers 56 and 57 immediately above the axles 25 and 26 and bearing against the cams 50 and 51. The side member is also provided with rollers 59 and 60 below the axles 25 and 26 and bearing against the cams 53 and 54. It is desirable to have the axes of the axle 25 and rollers 56 and 59 in a common vertical plane, and the axes of the axle 26 and rollers 57 and 60 in another common vertical plane.

An endless traction belt 63 formed of any suitable material, such as rubber or rubber composition, extends around wheels 29 and 45, said belt having upper and lower runs 64 and 65, respectively. If the transporter is relatively short, the belt may not need any support between its wheels, but it will usually be necessary to provide some form of intermediate support. This may be done by means of a plurality of idler wheels or rollers suitably supported by the frame 10. These wheels or rollers would extend between the upper and lower runs of the belt. In the form of the invention illustrated in Figures 1 to 9, a side frame 68 is located within the belt and extends between the wheels 29 and 45. This side frame may be of any desired construction, and it has grooves 69 and 70 along its upper and lower edges for accommodating the upper and lower runs of the belt. In order to reduce wear, an endless metal belt 72 may extend around the wheels and through the grooves of the side frames, see Figures 5 to 7. This metal belt may be secured to belt 60 or it may be free therefrom. In any case, the side frame is provided with a plurality of wells 74 opening outwardly therefrom at the bottoms of grooves 69 and 70 and having lubricating plugs 75 formed of suitable material, such as beeswax and graphite, projecting outwardly therefrom and urged outwardly by springs 76.

The side frame 68 needs to be supported by the main frame 10 in the same manner as the axles 25 and 26. In order to do this, one or more axles 80 are provided, there being two of these axles shown in Figures 1 and 2. Each end of each of these axles is fixedly secured to the side frame in any convenient manner. In this example, the axle is provided with a reduced portion 81 which is threaded on its outer end to receive a nut 82, see Figures 6 and 7.

A roller 85 is freely mounted on the axle 80 between the slides 37 and 38, said slides engaging this roller. The upper and lower slides are provided with cams 87 and 88 which are similar to and parallel with the other cams on these slides. The side member 11 of the frame 10 is provided with upper and lower rollers 89 and 90 which bear against the cams 87 and 88. It is preferable to have the axes of these rollers and the axle 80 in a common vertical plane.

A relatively large operating handle 93 is provided at one end of the transporter. One end of this handle is rotatably mounted on the tube 33 and has a pawl 94 mounted thereon for engaging a ratchet wheel 95 fixed on the tube. This pawl may be of any desired type. The one illustrated turns the wheel when the handle moves in one direction, and slides over the wheel when the handle is moved in the opposite direction. In addition to this, the pawl may be pulled away from the wheel and turned over so that when released, it works in the opposite way. Another pawl 96, similar to pawl 94, is supported by the adjacent side member 11 and engages the ratchet wheel 95. This second pawl holds the load when the first pawl is sliding back over the wheel.

If desired, a padded transverse stop 98 may be provided on the frame 10 adjacent the end thereof where the handle 93 is located.

The device described so far will function satisfactorily on its own, but it may be provided with retractable wheels for use under certain circumstances. Figures 1 and 2 show a set of wheels for this purpose. A pair of wheels 100 are carried by forks 101 which are fixedly or pivotally connected to brackets 102 which, in turn, are fixedly connected to a transverse shaft 103 journalled at its opposite ends in bearings carried by the side members 11. When the wheels are not in use, as shown in Figures 1 and 2, the forks 101 retain them within the frame 10, that is, the wheels do not project above or below said frame. A lever 106 is fixedly secured to shaft 103 and extends downwardly therefrom at an angle thereto. The outer end of the lever is moved back and forth in any suitable manner. In this example, a hydraulic cylinder 108 has a rod 109 fixedly secured to one end thereof, the opposite end of said rod being pivotally connected to the lever by a pin 110. A flexible tube 112 extends from this cylinder to a reservoir and pump 115 having a pump handle 116 projecting therefrom.

Another pair of wheels 120 is fixedly or pivotally mounted in a similar manner on a transverse shaft 121 having a lever 122 projecting downwardly therefrom at an angle thereto. A piston rod 125 extending from within the cylinder 108 is connected by a pin 126 to this lever. A tension spring 128 extends from the outer end of lever 122 to a fixed portion of the frame 10, such as one of the bars 17, as shown.

The hydraulic system is very simple and is well known in the hydraulic art. When the handle 116 is operated, fluid is pumped through the pipe 112 into the cylinder 108 to drive the rod 125 outwardly. This movement and the reaction of the cylinder swings the levers 106 and 122 downwardly to lower the pairs of wheels 100 and 120. When these wheels have been lowered sufficiently to lift the entire transporter, the pumping is stopped and the hydraulic lock retains the wheels in position. When it is desirable to raise the wheels, the hydraulic lock is broken and the spring 128 moves the rod 125 in the opposite direction relative to the cylinder. This raises the wheels back into the supporting frame.

The operation of the above-described transporter is very simple. When the traction belts 63 are in their neutral positions, as shown in Figures 1 and 2, the non-rotatable bottom of the supporting frame 10, or the friction strips 21, rest on the ground. If it is desired to load a heavy object on to the transporter, the pawl 94 is set so that a reciprocating motion of the handle 93 rotates the pinion 34 to move the slide 37 rearwardly and the slide 38 forwardly. As this takes place, the cams 53, 88 and 54 press against the rollers 59, 90 and 60. This action lifts the axles 25, 80 and 26. As the cams 50, 87 and 51 are moving in the opposite direction, they tend to recede from the rollers 56, 89 and 57, allowing this action to take place. This action lifts the traction belts as complete units so that the upper runs 64 thereof are positioned above the upper surface of the supporting frame, as clearly shown in Figures 4 and 7. It is now possible to place one end of a heavy object on to the upper runs of the traction belts at the end of the transporter remote from the operating handle. As the object is shifted towards the opposite end of the transporter, the belts move around their wheels so that the friction is reduced to a minimum. The supporting frame resting on the ground prevents movement of the transporter at this time. The object may be moved on to the transporter until it engages the stop 98.

When it is desired to move the transporter up or down an incline, such as a ramp or stairway, or other uneven ground, the traction belts are lowered until the lower runs 65 thereof extend below the bottom of the supporting frame, as shown in Figures 3, 5 and 6. It will be noted that the upper runs 64 of the belts are now below the top of the frame so that the object is resting on the latter. This is accomplished by reversing the pawl 94 and reciprocating the handle 93. This rotates the pinion 34 in a direction opposite to that described above, moving the slide 37 formardly and the slide 38 rearwardly in the supporting frame. Cams 50, 87 and 51 are pressed downwardly by the rollers 56, 89 and 57 at this time to move the axles 25, 80 and 26 downwardly. As the cams 53, 88 and 54 are moving in the opposite direction, the rollers 59, 90 and 60 permit this action. What actually happens is that the traction belts move downwardly until they engage the ground, after which the supporting frame moves upwardly until it is clear of the ground. The transporter may now be moved by means of the handle 93 or by pushing against the object positioned thereon. The traction belts rotate freely around the wheels 29 and 45 during this time. If it is desired to retard the motion of the transporter on a down grade, the belts may be lifted sufficiently to permit the supporting frame 10 or its friction strips 21 to drag on the ground. This acts as a brake, the degree of braking being adjusted by raising or lowering the belts. Of course, if the belts are raised high enough, the frame will rest on the ground and carry the whole weight entirely so that the transporter will be stationary.

If the transporter is being moved over even ground, the wheels 100 and 120 may be lowered in the manner described above in order to facilitate this operation.

While the transporter has been described as a device for carrying different objects, it will readily be understood that some article, such as a small crane, may be permanently mounted on the frame. In this case, the article may be transported from place to place on the belts or the wheels, and the latter may be raised so that the frame is resting on the ground when the article is to be kept in one position. Furthermore, it is obvious that the transporter may be made self-propelling. In this case, it would only be necessary to apply power to one or both of the axles 25 and 26, and/or to one or more of the wheels 100 and 120.

In addition, it is obvious that the traction belts may be omitted, in which case the transporter would run on wheels 29 and 45 when they are lowered. Each axle 80 may be provided with wheels at its opposite ends.

The load transporter of Figures 10 to 13 functions in the same manner as the above-described transporter, but it includes only a single centrally-located traction belt in place of the two belts of the other transporter. Slight changes have been made in the operating mechanism to show that such mechanism may be varied without affecting the basic concept of this invention. The main difference is that the traction belt is located inside the supporting frame.

A supporting frame 135 is made up of two identical non-rotatable and spaced side members 137, each of which includes a vertical side 138 and upper and lower flanges 139 and 140 projecting inwardly therefrom, see Figures 12 and 13. These side members are kept in their proper spaced relationship by a plurality of spaced cross rods 144 secured at their opposite ends to said members. If desired, friction strips 146 and 147 formed of any suitable material, such as rubber, may extend along the top and bottom of each side member 135.

A relatively wide traction belt 150 is mounted between the side members 135, said belt extending longitudinally of the loader and is movably mounted thereon. This belt is movably mounted on a central frome 153 having side plates 154 and 155, and a top and bottom 156 and 157. The central frame also includes wheels or drums 158 and 159 at the opposite ends thereof, and the top and bottom of the frame extend up to and are tangentially arranged with respect to the tops and bottoms of these wheels or drums. Belt 150 slidably extends around the frame 153 and its end wheels, and the frame is provided with flanges 160 and 161 along the sides of the top and bottom thereof to keep the belt from slipping laterally off the frame. The wheels 158 and 159 may also be provided with flanges 162 and 163 at the sides thereof.

End shafts 165 and 166 are provided at opposite ends of the transporter and upon which wheels 158 and 159 are mounted, these shafts projecting beyond the sides of the wheels into the side members 137. If desired, one or more intermediate shafts 168, three being shown, may extend through the central frame and beyond the sides thereof, each intermediate shaft being connected to the side plates of the frame in any convenient manner. Each of the cross rods 144 freely extends through elongated vertical slots 170 formed in the side plates 154 and 155 of frame 153, see Figure 11. Similarly, shafts 168 extend freely through vertical slots 171 in the frame side plates.

Traction belt 150 is shifted between a position with its upper run above the top of supporting frame 135 and another position with its lower horizontal run extending below the bottom of said frame by mechanism very similar to that of Figures 1 to 9. In fact, the same type of mechanism may be used, but Figures 10 to 13 show a different form of raising and lowering mechanism that could be used in either of the illustrated forms of the invention.

The ends of shafts 165 and 166 project freely through the side members 137. Figure 12 shows one end of shaft 165 extending through a vertical slot 175 formed in the side plate 138 of said member. The end of shaft 166 extends through a similar vertical slot in said member side.

As the mechanism for raising and lowering the belt is the same in each side member 137, one only will be referred to in detail. A pair of cam slides 180 and 182 extend longitudinally of the side member 137 within the flanges 139 and 140 thereof. Slide 180 has cone cams 184 and 185 at its opposite ends, while slide 182 has cone cams 187 and 188 at its opposite ends. The taper of all the cone cams extends in the same direction, or in other words, the surfaces of said cams are substantially parallel with each other, as clearly shown in Figure 11. Cams 184 and 187 are located on opposite sides of and engage a roller 190 mounted on end shaft 165, and the outer surfaces of said cams bear respectively against rollers 191 and 192 carried by side member 197. Similarly, cone cams 185 and 188 are located on opposite sides of and bear against a roller 194 mounted on end shaft 166, while the outer surfaces of said cams bear respectively against rollers 195 and 196 carried by side member 137. With this arrangement, when slide 180 is moved in one direction and slide 182 in the opposite direction, the side member is raised relative to shafts 165 and 166 and, consequently, relative to the centre frame 153 and its wheels 158 and 159, while movement of said slides in opposite directions moves the side member downwardly. Rollers 190 and 194 may be omitted if slides 180 and 182 are slidably mounted on the side member by other suitable means.

As the main portion of central frame 153 must move with the wheels thereof, mechanisms are provided at the ends of two or more of the intermediate shafts 168 for raising and lowering said shafts in unison with shafts 165 and 166. Figure 11 shows the moving mechanism of one shaft 168. Cone cams 200 and 201 are fixedly mounted on slides 180 and 182 above and below the shaft. The surfaces of these cams are parallel with those of cams 184—185 and 187—188. The inner surfaces of cams 200 and 201 engage a bearing or roller 203 mounted on shaft 168, while the upper and lower surfaces respectively of said cams engage bearings or rollers 205 and 206 carried by the side member 137. This arrangement causes the intermediate shafts and the central frame to move up and down with end shafts 165 and 166 when slides 180 and 182 are moved back and forth.

The movement of slides 180 and 182 in opposite directions may be accomplished in any convenient manner. In this example, slide 180 has a rack 210 fixedly mounted thereon, and slide 182 has a rack 211 fixedly mounted thereon, said racks being located on opposite sides of and meshing with a pinion 212 mounted on a shaft 213 that extends freely through vertical slots 215, see Figure 13, located in the side plates of central frame 153. An upwardly projecting lever 216 is fixedly mounted on this shaft between the central frame and one of the side members 137, see Figures 10, 11 and 13, and this lever has a vertical slot 217 therein in which a pin 218 rides. This pin is secured to and projects laterally from a cylinder 219, said cylinder having a piston 220 slidably mounted therein approximately midway between the ends thereof. The piston is mounted on a piston rod 221 which extends longitudinally of the cylinder and projects beyond both ends thereof, the ends of said rod being supported by lugs 223 and 224 projecting from the adjacent side member. Liquid is selectively supplied to opposite ends of the cylinder by pipes 226 and 227 extending from a pump and control unit 228 having an operating handle 229. This unit is carried by a transverse stop 232 supported at its opposite ends by the side members 137.

The pump and control unit 228 may be operated by means of handle 229 to direct fluid into one end of cylinder 219 causing said cylinder to move in one direction, thereby swinging lever 216 in the same direction. This causes racks 210 and 211 to move in opposite directions, and when fluid is pumped into the opposite end of cylinder 219, each rack is moved in the opposite direction.

The operation of the transporter of Figures 11 to 13 is very simple. When slide 180 is moved to the right and slide 182 to the left, with reference to Figure 11, side members 137 are raised relative to the traction belt 150 or, in other words, said belt is moved to a position with its lower horizontal run extending below the side members so that the transporter is carried by the belt. On the other hand, when slides 180 and 182 are moved to the left and right, respectively, the side members are moved downwardly and the belt is moved upwardly so that the unit rests on said members. When the transporter is being moved on the belt, if it is desired to slow its movement down a little, the side members which constitute the supporting frame 135 may be moved downwardly until the bottoms thereof drag a little on the surface over which the transporter is moving.

If desired, this transporter may be provided with wheels for relatively rapid movement over fairly even surfaces. For this purpose, pairs of wheels 235 and 236 are swingably mounted respectively on two of the shafts 168. These wheels normally lie in positions within the top and bottom of the supporting frame 135, and they are raised and lowered by a hydraulic mechanism 240 which is the same as that for raising and lowering the wheels 100 and 120 of the previously-described form of the invention. The wheels are raised and lowered by operating a pump and control unit 242 having a handle 243, see Figure 12, said unit being connected to the mechanism 240 by a flexible pipe 245.

If desired, a relatively large handle, not shown, may be connected to either end of the transporter, by means of which the latter may be moved from place to place.

From the above it will be seen that the two illustrated transporters operate on exactly the same principle. Each transporter includes a frame upon which a load may be placed, and at least one movable endless traction belt having upper and lower runs extending longitudinally of the frame. Each belt is movable in a vertical plane relative to the frame, and said device includes means for selectively raising each belt with its upper and lower runs above the top and bottom respectively of the frame and lowering said runs below the frame top and bottom. The frame engages the ground and tends to prevent movement of the transporter when each belt is raised and is lifted off the ground when said belt is lowered.

What I claim as my invention is:

1. In a heavy load transporter, a frame upon which a load may be placed, said frame having a non-rotatable bottom for frictionally engaging the ground on which the transporter is located, a movable endless traction belt having upper and lower runs extending longitudinally of the frame and movable vertically above the top and bottom respectively of the frame, said upper belt run being below the frame top when the bottom run is below the frame bottom and vice versa, and means for selectively moving the upper belt run above the frame top and the bottom belt run below the frame bottom, said frame engaging the ground to prevent movement of the transporter when the belt runs are moved upwardly and being lifted off the ground when said runs are moved downwardly, the upper belt run when moved above the top of the frame being adapted to receive and convey a load longitudinally of the frame and depositing said load on the frame when moved below the frame top.

2. In a heavy load transporter, a frame upon which a load may be placed, said frame having a non-rotatable bottom for frictionally engaging the ground on which the transporter is located, a movable endless traction belt having horizontal upper and lower runs extending longitudinally of the frame and movable vertically while remaining horizontal above the top and bottom respectively of the frame, said upper belt run being completely below the frame top when the bottom run is completely below the frame bottom and vice versa, and means for selectively moving the horizontal top belt run completely above the frame top and the horizontal bottom belt run completely below the frame bottom, said frame engaging the ground to prevent movement of the transporter when the belt runs are moved upwardly and being lifted off the ground when said runs are moved downwardly, the upper belt run when moved above the top of the frame being adapted to receive and convey a load longitudinally of the frame and depositing said load on the frame when moved below the frame top.

3. In a heavy load transporter, a frame upon which a load may be placed, said frame having a non-rotatable bottom for frictionally engaging the ground on which the transporter is located, a movable endless traction belt having upper and lower runs extending longitudinally of the frame completely from end to end thereof, said belt being connected to and movable in a vertical plane relative to the frame, and means for selectively raising the belt with its upper and lower runs above the top and bottom respectively of the frame and lowering said runs below the frame top and bottom, said frame engaging the ground and tending to prevent movement of the transporter when the belt is raised and being lifted off the ground when the belt is lowered, and said belt when raised being available above the frame for receiving loads to shift them over the frame and when said belt is lowered depositing the loads on to the frame.

4. In a heavy load transporter, a frame upon which a load may be placed, said frame having a bottom for frictionally engaging the ground on which the transporter is located, a movable endless traction belt having upper and lower runs extending longitudinally of the frame, said belt being connected to and movable in a vertical plane relative to the frame, means for selectively raising the belt with its upper and lower runs above the top and bottom respectively of the frame and lowering said runs below the frame top and bottom, said frame engaging the ground and tending to prevent movement of the transporter when the belt is raised and being lifted off the ground when the belt is lowered, said belt when raised being available above the frame for receiving loads to shift them over the frame and when said belt is lowered depositing the loads on to the frame, a plurality of retractable wheels mounted on the frame, and means for lowering the wheels to take the entire load of the transporter.

5. In a heavy load transporter, a frame upon which a load may be placed, said frame having a non-rotatable bottom for frictionally engaging the ground on which the transporter is located, a movable endless traction belt at each side of and connected to the frame, each belt having upper and lower runs extending longitudinally of the frame and movable vertically above the top and bottom respectively of the latter, the upper run of each belt being below the frame top when the lower run of said belt is below the frame bottom and vice versa, and means for selectively moving both upper belt runs above the frame top and both bottom belt runs below the frame bottom, said frame engaging the ground to prevent movement of the transporter when the belt runs are moved upwardly and being lifted off the ground when said runs are moved downwardly, the upper belt run when moved above the top of the frame being adapted to receive and convey a load longitudinally of the frame and depositing said load on the frame when moved below the frame top.

6. In a heavy load transporter, a frame upon which a load may be placed, said frame having a non-rotatable bottom for frictionally engaging the ground on which the transporter is located, a movable endless traction belt at each side of and connected to the frame, each belt having horizontal upper and lower runs extending longitudinally of the frame and movable vertically above the top and bottom respectively of the latter, the upper run of each belt being completely below the frame top when the lower run of said belt is completely below the frame bottom and vice versa, and means for selectively moving both upper belt runs completely above the frame top and both bottom belt runs completely below the frame bottom while retaining said runs in their horizontal positions, said frame engaging the ground to prevent movement of the transporter when the belt runs are moved upwardly and being lifted off the ground when said runs are moved downwardly, the upper belt run when moved above the top of the frame being adapted to receive and convey a load longitudinally of the frame and depositing said load on the frame when moved below the frame top.

7. A heavy load transporter comprising a frame upon which a load may be placed, said frame having a non-rotatable bottom for frictionally engaging the ground on which the transporter is located, transverse axles adjacent opposite ends of the frame mounted for vertical movement in the latter, aligned bearings on the axles, an endless traction belt extending around the bearings, said belt having upper and lower runs near the top and bottom of the frame, means in the frame for selectively raising and lowering the axles to move the upper and lower runs of the belt extending around the bearings thereof above the frame top and bottom respectively and lowering said runs below said top and bottom, said frame engaging the ground and tending to prevent movement of the transporter when the belt runs are moved upwardly and being lifted off the ground when said runs are moved downwardly, the upper belt run when moved above the top of the frame being adapted to receive and convey a load longitudinally of the frame and depositing said load on the frame when moved below the frame top.

8. A heavy transporter as claimed in claim 7 in which the axles extend through vertical openings in the frame, and the means for raising and lowering said axles comprises a pair of spaced slides extending longitudinally of the frame above and below the axles slidably connected to the latter, cams on the upper and lower edges of the slides, bearings on the frame above and below the upper and lower cams respectively and engaging said cams, and means for reciprocating the slides in opposite directions, said cams being such that movement thereof by the slides shifts the frame and axles relative to each other.

9. A heavy load transporter comprising a frame upon which a load may be placed, said frame having a non-rotatable bottom for frictionally engaging the ground on which the transporter is located, transverse axles adjacent opposite ends of the frame mounted for vertical movement in the latter, a set of aligned wheels on the axles at each side of the frame, an endless traction belt extending around each set of wheels, said belts having upper and lower runs near the top and bottom of the frame, and means in the frame for selectively raising and lowering both sets of wheels to move the upper and lower runs of the belt extending therearound above the frame top and bottom respectively and lowering said runs below said top and bottom, said upper and lower belt runs being maintained in substantially horizontal planes when they are in their upper and lower positions, the upper belt run when moved above the top of the frame being adapted to receive and convey a load longitudinally of the frame and depositing said load on the frame when moved below the frame top.

10. A heavy transporter as claimed in claim 9 in which the axles extend through vertical openings in the frame, and the means for raising and lowering each set of wheels comprises a pair of spaced slides extending longitudinally of the frame above and below the axles, a rotating element on each axle between and in engagement with the slides, cams on the upper and lower edges of the slides, bearings on the frame in engagement with said cams, and means for reciprocating the slides in opposite directions, said cams being such that movement thereof by the slides shifts the frame and axles relative to each other.

11. A heavy transporter as claimed in claim 9 in which the axles extend through vertical openings in the frame, and the means for raising and lowering each set of wheels comprises a pair of spaced slides extending longitudinally of the frame above and below the axles, a pinion rotatably mounted on one axle between the slides, racks on the slides meshing with the pinion on opposite sides of the axle, a roller on the other axle between and engaging the slides, cams on the upper and lower edges of the slides, bearings in the frame in engagement with said cams, and means for rotating the pinion in opposite directions to reciprocate the slides oppositely to each other, said cams being such that movement thereof by the slides shifts the frame and axles relative to each other.

12. A heavy transporter as claimed in claim 9 in which there is a slide cam above and below each axle and the axes of the axle and the frame bearings engaging these cams are in a common plane.

13. A heavy load transporter comprising a supporting frame upon which a load may be placed, transverse axles adjacent opposite ends of the frame mounted for substantially vertical movement in the latter, a set of aligned wheels on the axles at each side of the frame, an endless traction belt extending around each set of wheels, said belts having upper and lower runs near the top and bottom of the frame, a side frame within the runs of each belt extending between the wheels thereof for supporting the belt between said wheels, and means in the supporting frame for selectively raising and lowering both sets of wheels and the frame therebetween to move the upper and lower runs of the belt extending therearound above the frame top and bottom respectively and lowering said runs below said top and bottom, said upper and lower belt runs being maintained in substantially horizontal planes when they are in their upper and lower positions, the upper belt run when moved above the top of the frame being adapted to receive and convey a load longitudinally of the frame and depositing said load on the frame when moved below the frame top.

14. A heavy transporter as claimed in claim 13 in which the axles extend through vertical openings in the frame, and the means for raising and lowering each set of wheels and the side frame associated therewith comprises at least one transverse axle slidably connected to the side frame for vertical movement relative thereto, a pair of spaced slides extending longitudinally of the supporting frame above and below the axles, a rotating element on each axle between and in engagement with the slides, cams on the upper and lower edges of the slides, bearings on the supporting frame in engagement with said cams, and means for reciprocating the slides in opposite directions, said cams being such that movement thereof by the slides shifts the frame and axles relative to each other.

15. A heavy transporter as claimed in claim 13 in which the axles extend through vertical openings in the frame, and the means for raising and lowering each set of wheels and the side frame associated therewith comprises at least one transverse axle slidably connected to the side frame for vertical movement relative thereto, a pair of spaced slides extending longitudinally of the supporting frame above and below the axles, a pinion rotatably mounted on one axle between the slides, racks on the slides meshing with the pinion on opposite sides of said axle, a roller on each of the other axles between and engaging the slides, cams on the upper and lower edges of the slides, bearings in the supporting frame in engagement with said cams, and means for rotating the pinion in opposite directions to reciprocate the slides oppositely to each other, said cams being such that movement thereof by the slides shifts the frame and axles relative to each other.

16. A heavy transporter as claimed in claim 15 in which there is a slide cam above and below each axle and the axes of the axle and the supporting frame bearings engaging these cams are in a common plane.

17. A heavy load transporter comprising a supporting frame having spaced parallel side members, said frame members having bottoms for frictionally engaging the ground under the transporter and tops upon which a load may be placed, a movable endless traction belt mounted on the frame between the side members thereof, said belt having upper and lower runs extending longitudinally of the frame and movable vertically above the top and bottom respectively of the frame members, said upper belt run being between the member tops when the bottom run is below the member bottoms and vice versa, and means for selectively moving the upper belt run above the member tops and the bottom belt run below the member bottoms, said frame engaging the ground to prevent movement of the transporter when the belt runs are moved upwardly and being lifted off the ground when said runs are moved downwardly, and said upper belt run when above the tops of the frame members being adapted to receive and convey a load longitudinally of said members and depositing the load on the latter when moved below the tops thereof.

18. A heavy load transporter comprising an elongated central frame, an endless traction belt mounted on said frame for movement therearound and having upper and lower runs extending longitudinally of the transporter, a supporting frame haivng a side member on each side of the central frame, said central and supporting frames being movable relative to each other, said frame members having bottoms for frictionally engaging the ground under the transporter and tops upon which a load may be placed when the members are lowered and raised respectively relative to the central frame, and means for selectively moving the central and supporting frames up and down relative to each other respectively to move the upper run of the belt above the side member tops and the lower belt run below the side member bottoms to permit the upper run when up to take a load and the lower run when down to carry the transporter, the bottoms of the side members engaging the ground and tending to prevent movement of the transporter when the supporting frame is down and being lifted off the ground when the supporting frame is up, and said upper belt run when above the side member tops being adapted to receive and convey a load longitudinally of said members and deposit the load on the latter when moved below the tops thereof.

19. A heavy load transporter comprising a supporting frame having spaced parallel side members, said frame members having bottoms for frictionally engaging the ground under the transporter and tops upon which a load may be placed, a movable endless traction belt mounted on the frame between the side members thereof, said belt having horizontal upper and lower runs extending longitudinally of the frame and movable vertically above the top and bottom respectively of the frame members, said upper belt run being completely between the member tops when the bottom run is completely below the member bottoms and vice versa, and means for selectively moving the upper belt run completely above the member tops and the bottom belt run completely below the member bottoms while retaining said runs in their horizontal positions, said frame engaging the ground to prevent movement of the transporter when the belt runs are moved upwardly and being lifted off the ground when said runs are moved downwardly, and said upper belt run when above the tops of the frame members being adapted to receive and convey a load longitudinally of said members and depositing the load on the latter when moved below the tops thereof.

20. A heavy load transporter comprising a supporting frame having spaced parallel side members, said frame members having bottoms for frictionally engaging the ground under the transporter and tops upon which a load may be placed, an elongated central frame between the side members of the supporting frame, drums at opposite ends of the central frame, transverse axles extending between opposite ends of the side members and through the drums, said axles being mounted for vertical movement on the side members and the drums being mounted on the shafts, an endless traction belt extending around the drums and having upper and lower runs extending over the central frame, means in the side members for selectively raising and lowering the axles to move the upper and lower runs of the belt above the side member tops and bottoms respectively and lowering said runs below said tops and bottoms, the bottoms of said side members engaging the ground and tending to prevent movement of the transporter when the belt runs are moved upwardly and being lifted off the ground when said runs are moved downwardly, and the upper belt run when above the tops of the frame members being adapted to receive and convey a load longitudinally of said members and depositing the load on the latter when moved below the tops thereof.

21. A heavy transporter as claimed in claim 20 in which the axles extend through vertical openings in the supporting frame side members, and the means for raising and lowering said axles comprises a pair of spaced slides extending longitudinally of each side member above and below the axles slidably connected to the latter, cams on the upper and lower edges of the slides, bearings on the side members above and below the upper and lower cams respectively and engaging said cams, and means for reciprocating the slides in opposite directions, said cams being such that movement thereof by the slides shifts the supporting frame and axles relative to each other.

22. A heavy transporter as claimed in claim 21 in which the means for reciprocating the slides in each side member comprises a pinion rotatably mounted on the side member between the slides, racks on the slides meshing with the pinion on opposite sides thereof, a roller on each axle rotatably mounted on the side member between and engaging the slides, and means connected to the pinion for rotating it in opposite directions.

23. A heavy transporter as claimed in claim 22 in which there is a slide cam above and below each axle and the axes of the axle and the frame bearings engaging these cams are in a common vertical plane.

References Cited in the file of this patent

UNITED STATES PATENTS

| | | |
|---|---|---|
| 576,764 | Price | Feb. 9, 1897 |
| 1,550,982 | Phillips | Aug. 25, 1925 |
| 2,021,503 | Fildes | Nov. 19, 1935 |
| 2,122,200 | Fourment | June 28, 1938 |

FOREIGN PATENTS

| | | |
|---|---|---|
| 193,891 | Great Britain | Feb. 28, 1923 |
| 528,270 | France | Oct. 12, 1921 |